United States Patent [19]
Bibette et al.

[11] Patent Number: 5,938,581
[45] Date of Patent: Aug. 17, 1999

[54] EMULSION MANUFACTURING PROCESS

[75] Inventors: Jérôme Michel Bibette, Bordeaux; Thomas Mason, Gradignan, both of France

[73] Assignee: Centre National de la Recherche Scientifique (C.N.R.S.), Paris, France

[21] Appl. No.: 08/981,307

[22] PCT Filed: Apr. 16, 1997

[86] PCT No.: PCT/FR97/00690

§ 371 Date: Apr. 6, 1998

§ 102(e) Date: Apr. 6, 1998

[87] PCT Pub. No.: WO97/38787

PCT Pub. Date: Oct. 23, 1997

[30] Foreign Application Priority Data

Apr. 16, 1996 [FR] France .................................. 96/04736

[51] Int. Cl.⁶ ................................ B01J 13/00; B01F 9/20
[52] U.S. Cl. ..................... 516/58; 366/176.1; 366/180.1; 516/76; 516/929
[58] Field of Search ..................... 252/312, 314; 366/176.1, 180.1; 516/58, 76, 929

[56] References Cited

U.S. PATENT DOCUMENTS

| | | | |
|---|---|---|---|
| 2,755,194 | 7/1956 | Volkmann et al. | 252/312 X |
| 3,565,817 | 2/1971 | Lissant | 252/312 |
| 3,634,285 | 1/1972 | Brooks | 252/312 |
| 4,290,910 | 9/1981 | Harada et al. | 252/312 |
| 4,539,139 | 9/1985 | Ichikawa et al. | 252/314 |
| 5,370,824 | 12/1994 | Nagano et al. | 252/314 |
| 5,558,820 | 9/1996 | Nagano et al. | 252/314 X |

OTHER PUBLICATIONS

Advances in Chemistry Series 231, "Emulsions–Fundamentals and Applications in the Petroleum Industry", L.L. Schramm, Editor, Am. Chem. Soc., Washington, D.C (1992), pp. 134–136.

Primary Examiner—Richard D. Lovering
Attorney, Agent, or Firm—Jacobson, Price, Holman & Stern, PLLC

[57] ABSTRACT

The invention concerns a process for preparing a secondary emulsion consisting of droplets of a phase A, dispersed in a phase B, A being immiscible in B, starting with a polydispersed primary emulsion of identical formulation and consisting of droplets of the said phase A dispersed in the said phase B, the droplets of the secondary emulsion having a diameter in all cases which is less than the diameter of the droplets of the primary emulsion, characterized in that the starting primary emulsion is viscoelastic and in that the said starting primary emulsion is subjected to a controlled shear such that the same maximum shear is applied to the entire emulsion.

24 Claims, 8 Drawing Sheets

EMULSION MANUFACTURING PROCESS

This application is a 371 of PCT/FR97/00690, filed Apr. 16, 1997.

The invention relates to a process for preparing an emulsion consisting of droplets of a phase A, dispersed in a phase B, the phases A and B being immiscible.

The process of the invention is more particularly useful for preparing monodispersed emulsions.

The process of the invention is also applicable to the preparation of emulsions with a low surfactant content.

Many emulsification techniques are known at the present time. Among the most common, mention may be made of microfluidization and ultrasonication techniques.

Microfluidization consists of the high-pressure spraying of a liquid jet consisting of two immiscible fluids onto a solid wall. The turbulences and cavitations thus induced lead to the dispersion of one fluid in the other.

Ultrasonication allows the dispersion of a given fluid in another fluid which forms the continuous phase which is not dispersible in the first. By this process, a mixture of the two fluids is subjected to high-intensity ultrasonic vibrations which create the cavitation phenomena leading to the dispersion of one fluid in the other.

European patent applications EP 442,831 and EP 517,987 moreover disclose processes for preparing monodispersed emulsions of the oil-in-water or magnetizable polymer-in-water type. These processes comprise steps consisting in:

a) adjusting the content of oil or of polymer, respectively, of a polydispersed primary stable emulsion to a value of between 1 and 40% by weight;

b) increasing the surfactant concentration of the polydispersed primary emulsion so as to obtain two phases, a so-called liquid phase in which the oil droplets or the polymer droplets, respectively, are free, and a so-called solid phase in which the droplets are combined;

c) separating the liquid phase from the solid phase; and d) optionally repeating operations a) to c) above as many times as necessary to obtain the monodispersed emulsion.

These processes involve the fractionation of a starting primary emulsion by successive creaming operations.

It goes without saying that these first two long and tiresome processes are not readily industrializable.

The invention proposes a process for preparing an emulsion starting from a simple primary emulsion consisting of two immiscible phases, this process being particularly suitable for industrial application and particularly easy to carry out.

More specifically, the invention provides a process for preparing a secondary emulsion consisting of droplets of a phase A, dispersed in a phase B, A being immiscible in B, starting with a polydispersed primary emulsion of identical formulation and consisting of droplets of the said phase A dispersed in the said phase B, the droplets of the secondary emulsion having a diameter in all cases which is less than the diameter of the droplets of the primary emulsion, characterized in that the starting primary emulsion is viscoelastic and in that the said starting primary emulsion is subjected to a controlled shear such that the same maximum shear is applied to the entire emulsion.

In the context of the present invention, the term primary emulsion is understood to refer to the starting emulsion used to produce the target emulsion, which is referred to as the secondary emulsion.

It will be noted that, according to the invention, the formulations of the starting primary emulsion and of the secondary target emulsion are identical, which, in other words, means that these emulsions contain the same ingredients in equal amounts.

According to a preferred embodiment of the invention, the primary emulsion is simple: in this case, it consists of a homogeneous first phase dispersed in a homogeneous second phase, known as the continuous phase, the said first and second phases by definition being immiscible.

However, it is possible to carry out the process of the invention starting with a double emulsion consisting of droplets of a given emulsion or a given dispersion in a homogeneous continuous phase.

As an example of double emulsions, mention may be made of emulsions of water-in-oil-in-water type.

Starting with such double emulsions, a secondary emulsion of the same type, that is to say a double emulsion, is obtained.

The process of the invention is applicable irrespective of the nature of the dispersed and continuous phases, the essential characteristic being the immiscibility of these two phases under the emulsification conditions, and, in particular, under the given temperature and pH conditions.

In fact, according to the invention, the term "phase" covers both pure substances and complex colloidal or fluid solutions. A primary emulsion of water-in-oil or oil-in-water type can thus be envisaged.

However, according to a preferred embodiment, the primary emulsion is an emulsion of oil-in-water type.

According to the invention, the term "oil" is understood to refer to any hydrophobic substance which is insoluble or very sparingly soluble in water and which can be made into a stable aqueous emulsion of the oil-in-water type, optionally using a surfactant. Such a hydrophobic and insoluble substance can be, for example, an organic polymer such as a polyethylene glycol, a poly(acrylic acid) or a polyorganosiloxane, an organic latex, a mineral oil, hexadecane or liquid crystals (lyotropic or thermotropic crystals).

The polyorganosiloxanes, or silicone, are organosilyl polymers comprising Si-O-Si bonds.

It is known how to make aqueous emulsions out of virtually all silicones which are in the form of polymers that are relatively viscous fluids or solids at room temperature.

Silicone polymers are linear, cyclic or branched. Highly branched polymers are also known as resins. They can be in the form of relatively viscous fluids or solids.

Polydiorganosiloxanes are substantially linear polymers in the form of relatively viscous fluids ranging from quite non-viscous oils to gums.

The process according to the invention is advantageously applicable to silicone emulsions in which the silicone is a substantially linear polydiorganosiloxane blocked at each of its ends with a silanol function or with a triorganosiloxyl radical, and whose viscosity at 25° C. is generally between 25 mPa.s and $30 \times 10^6$ mPa.s.

The polydiorganosiloxane can thus be either a viscous oil or a gum. The organic radicals linked to the silicon are monovalent hydrocarbon radicals generally chosen from $C_1$–$C_{15}$ alkyl, phenyl and vinyl radicals and hydrogen atoms.

Nevertheless, the silicone is preferably a polydimethylsiloxane.

It should be understood that, according to the invention, the dispersed phase A and the continuous phase B can consist of one or more different chemical compounds: For example, in order to improve the stability of oil-in-water emulsions, it may be necessary to add one or more surfactants to the aqueous phase, preferably nonionic or anionic surfactants, but also cationic, zwitterionic or amphoteric surfactants.

It will be noted that starting with a stable primary emulsion, the process of the invention leads to a stable secondary emulsion.

When the emulsion is prepared from oil and water in the presence of one or more surfactants, the surfactant(s) preferably constitute(s) from 20 to 40% of the weight of the aqueous phase.

These surfactants are well known to those skilled in the art and are described, in particular, in American patents U.S. Pat. No. 2,891,920, U.S. Pat. No. 3,294,725, U.S. Pat. No. 3,360,491 and U.S. Pat No. 3,983,148 and French patent FR-A-2,605,634 which are cited by way of reference.

The anionic surfactants are chosen from alkali metal alkylbenzene sulphonates, alkali metal alkyl sulphates such as sodium dodecyl sulphate, alkali metal alkyl ether sulphates, alkali metal alkylaryl ether sulphates and alkali metal dioctylsulphosuccinates.

The cationic surfactants used in accordance with the invention are chosen from $di(C_{10}-C_{30})$ alkylbenzyldimethylammonium halides and polyethoxylated quaternary ammonium salts.

The amphoteric surfactants used in accordance with the invention are chosen from $N-(C_{10}-C_{22})$alkylbetains, $N-(C_{10}-C_{22})$alkylamidobetains, $(C_{10}-C_{22})$alkylimidazolines and asparagine derivatives.

The nonionic surfactants are chosen from polyethoxylated fatty acids, sorbitan esters, polyethoxylated sorbitan esters, polyethoxylated alkylphenols, polyethoxylated fatty alcohols, polyethoxylated or polyglycerolated fatty amides, and polyglycerolated alcohols and alphadiols.

Similarly, the oil can consist of one or more hydrophobic substances that are insoluble or very sparingly soluble in water.

According to the invention, it is essential for the starting primary emulsion to be viscoelastic. It should be understood that the viscoelastic properties characterize the entire emulsion: in other words, this involves effective viscoelasticity.

The term viscoelastic has the meaning generally attributed to it in the art. In general, a material is said to be viscoelastic when, under the effect of shear, it has both the characteristics of a purely elastic material, that is to say that it is capable of storing energy, and the characteristics of a purely viscous material, that is to say that it is also capable of dissipating energy.

According to the invention, the viscoelasticity range is delimited by equations (1) and (2) below showing the variations in the modulus of elasticity G' and in the loss modulus G":

$$1\times10^{-2} \text{ dyne/cm}^2 \, (1\times10^{-3} \text{ N/m}^2) \leq (G'^2+G''^2)^{1/2} \leq 1\times10^8 \text{ dyne/cm}^2 \, (1\times10^7 \text{ N/m}^2). \quad (1)$$

$$\frac{G''}{G'} \geq 0.01 \quad (2)$$

G' and G" being measured at the maximum shear rate to which the primary emulsion is intended to be subjected.

The moduli G' and G" preferably satisfy equations (3) and (4) below:

$$1 \text{ dyne/cm}^2 \, (1\times10^{-1} \text{ N/m}^2) \leq (G'^2+G''^2)^{1/2} \leq 1\times10^4 \text{ dyne/cm}^2 \, (1\times10^3 \text{ N/m}^2). \quad (3)$$

$$0.1 \leq \frac{G'}{G''} \leq 10 \quad (4)$$

The effective viscoelasticity of the emulsion depends on various parameters. Among these, mention may be made of the viscoelasticity of the continuous phase and the proportion of drops dispersed in the continuous phase.

Depending on the nature of the phases present and their respective proportion, a person skilled in the art will thus be able to vary one or other of these parameters, possibly both of them, in order to arrive at the desired effective viscoelasticity, merely using his general knowledge of the art.

According to a preferred embodiment, the effective viscoelasticity of the primary emulsion is obtained by selecting a viscoelastic continuous phase.

In the case of oil-in-water emulsions, the viscoelasticity of the aqueous phase can be obtained by incorporating one or more additives, such as surfactants.

However, when it is desired to limit the amount of surfactant, or alternatively when the nature of the surfactant is such that the resulting emulsion does not have the desired viscoelasticity properties, it is possible to incorporate an additional additive possibly lacking surface properties but effective in terms of its thickening activity.

An example of such a constituent which may be mentioned is dextran.

Alternatively, in order to achieve the desired effective viscoelasticity properties of the emulsion, it is possible to increase the amount of dispersed phase: in this case, the proportion of dispersed phase will be at least 65% by weight relative to the total weight of the emulsion, preferably at least 80%.

It will be noted that when the primary emulsion is such that its continuous phase is itself viscoelastic, or when the proportion of dispersed phase is at least 65% by weight relative to the total mass of the emulsion, the amount of surfactant added can be zero and is generally not greater than 5% by weight relative to the total mass of the emulsion.

Thus, the process of the invention allows the preparation of emulsions containing less than 5% surfactant.

According to the process of the invention, the droplets of the secondary emulsion have a diameter which is less than the smallest diameter of the droplets of the starting polydispersed emulsion.

The diameter of the droplets of the secondary emulsion thus depends on the diameter of the droplets of the starting emulsion. Depending on the application envisaged for the secondary emulsion, it will be convenient to select the starting primary emulsion such that the size of the droplets of the primary emulsion is greater than the size of the droplets of the target emulsion, which is determined by the field of application.

In general, the droplets of the starting primary emulsion have a diameter ranging between 1 and 100 $\mu$m, preferably between 10 and 100 $\mu$m.

The size of the droplets of the starting primary emulsion can be controlled in a manner which is known per se during its preparation by adjusting the operating conditions.

The starting primary emulsion is readily prepared by those skilled in the art using conventional emulsification processes, known in the art, which lead to polydispersed emulsions, such emulsions being characterized by a wide distribution of the diameter of the droplets The primary emulsion is advantageously prepared by adding one of the two phases drop-by-drop to the continuous phase with constant stirring. By carrying out this process, it is possible to control the minimum threshold diameter of the droplets forming the primary emulsion by adjusting the rate of introduction of the drops of the first phase into the continuous phase relative to the stirring speed of the continuous phase. Preferably, the ratio of the rate of introduction of the drops to the volume of the continuous phase will be maintained throughout the addition at a value 10 to 100 times lower than the stirring speed of the continuous phase.

Many different devices can be used to stir the continuous phase during the preparation of the primary emulsion. However, it is preferred to use mechanical shear stirrers whose geometry ensures a certain level of homogeneity of the shear rate. In order to prevent the formation of droplets that are too small, excessively large inhomogeneities of the shear rates applied should be avoided.

By this process, a polydispersed primary emulsion having a uniform average viscosity, which is referred to herein as a uniform effective viscosity, is obtained.

The process of the invention consists in subjecting a viscoelastic primary emulsion to a controlled shear such that the same maximum shear is applied to the entire emulsion.

To do this, it may be envisaged to subject the entire emulsion to a constant shear rate.

However, the invention is not intended to be limited to this specific embodiment.

Indeed, the shear rate can be different, at a given time, for two points of the emulsion.

By varying the geometry of the device used to generate the shear forces, it is possible to modify the shear rate applied to the emulsion over time and/or in space.

Provided that the emulsion is flowing when subjected to the shear, each part of the emulsion can thus be subjected to a shear rate which varies over time. The shear is said to be controlled when, irrespective of the variation in the time of the shear rate, it passes through a maximum value which is the same for all parts of the emulsion, at a given instant which can differ from one point in the emulsion to another.

In a preferred manner, in order to control the shear, the primary emulsion is introduced into a suitable device. This device can have many different configurations. The exact configuration is not essential according to the invention provided that, on leaving this device, the entire emulsion has been subjected to the same maximum shear.

BRIEF DESCRIPTION OF THE DRAWINGS

FIGS. 1 to 5 schematically represent three types of device which can be used in the context of the invention.

In FIG. 1, the inner cylinder 2 is immobile whereas the outer cylinder 3 is placed in uniform rotational motion relative to a drive axle 15. The concentric cylinders 2 and 3 delimit an annular chamber 4. Two annular leaktight ballbearings 5 and 6 are located at the upper and lower ends of the chamber 4. A lid 7 whose dimensions correspond to those of the outer cylinder 3 closes the upper part of the device 1.

The concentric cylinders 2 and 3 are offset relative to each other in the longitudinal direction such that the lower part 8 of the inner cylinder rests on a flat support 9.

The Couette cell 1 represented in FIG. 1 also comprises a primary emulsion supply pipe 10 which passes through the support 9 and emerges in the upper part 11 of the chamber 4. The other end of the supply pipe is connected to a reservoir 12 containing the primary emulsion. The rate of supply of primary emulsion is controlled by a piston 13. The lower part of the chamber 4 diagonally opposite the point 11 is fitted with a secondary emulsion discharge pipe 14 which passes through the flat support 9.

The device in FIG. 1 allows the continuous preparation of the target secondary emulsion. During production, the chamber 4 is supplied continuously with primary emulsion via the pipe 10. The primary emulsion circulates in the chamber 4 while being subjected to shear forces generated by the uniform rotation of the outer cylinder 3 on itself.

In such a device, the primary emulsion is subjected to a constant shear rate, the shear rate being defined here as the ratio of the linear speed, at the point of contact with the surface of the outer cylinder 3, to the difference $(R_3-R_2)$ where $R_2$ and $R_3$ are, respectively, the radii of the inner cylinder 2 and outer cylinder 3.

When the emulsion is recovered on leaving the discharge pipe 14, it has the properties of the target secondary emulsion.

When non-continuous running is desired, it suffices to introduce a defined volume of the primary emulsion via the supply pipe 10.

In general, the rate of supply of primary emulsion will be kept sufficiently low, such that the value of the shear rate in the direction of flow is considerably less than the shear rate generated by the uniform rotation of the outer cylinder 3 as defined above.

In FIG. 2, the upper plate 17 is driven in a to-and-fro motion relative to the lower plate 18 which is immobile. This to-and-fro motion takes place in a direction parallel to the two plates 17 and 18: the exact direction of the motion is indicated in FIG. 3 by the two-headed arrow.

The two plates 17 and 18 delimit a chamber 19 in which the primary emulsion circulates.

The chamber 19 is closed at two of its ends by two parallelepipedal-shaped leaktight Teflon joints 26 and 27 which act as spacers between the two plates 17 and 18.

The device 16 in FIGS. 2 and 3 also comprises a primary emulsion supply pipe 20 which passes through the lower plate 18 and emerges in the central part 21 of the chamber 19. The other end of the pipe 20 is connected to a reservoir 22 containing the primary emulsion. The rate of supply of primary emulsion is controlled by a piston 23.

The device 16 is also adapted for the continuous preparation of the target secondary emulsion. During production, the chamber 19 is continuously supplied with primary emulsion via the pipe 20. The primary emulsion circulates from the central part 21 of the chamber 19 towards the side edges 24 and 25 of the chamber 19 (represented in FIG. 3) while at the same time being subjected to shear forces generated by the oscillating motion of the pipe 17.

FIGS. 4 and 5 show a device 30 which can also be used according to the invention. This device consists of two concentric discs 31 and 32 delimiting a chamber 33 in which the primary emulsion circulates. FIG. 4 is a cutaway view of the device 30, whereas In FIGS. 4 and 5, the upper disc 31 is immobile whereas the lower disc 32 is rotated uniformly about its axis. The device 30 comprises a primary emulsion supply pipe 34 which passes through the upper disc 31 and emerges in the central part 35 of the chamber 33. The other end of the pipe 34 is connected to a reservoir, not represented in FIGS. 4 and 5, containing the primary emulsion.

The device 30 in FIGS. 4 and 5 is also designed for the continuous production of the target secondary emulsion.

During production, the chamber 33 is supplied with primary emulsion via the pipe 34. The primary emulsion circulates from the central part 35 of the chamber 33 to the periphery of the chamber 33 in which the secondary emulsion is collected.

In such a device, the shear rate to which the primary emulsion is subjected is not constant but instead increases linearly as a function of the distance to the axis of rotation and the speed of rotation. However, during its progress in this device, the entire emulsion is subjected to the same variation in shear rate.

Another type of device is the plane/cone type cell, in which a cone whose point is directed towards a plane, and whose axis is perpendicular to this plane, spins at a constant angular speed at a distance from the plane.

These cells are commonly used in commercial machines, in particular rheometers which allow the viscoelastic properties of liquids to be measured (for example: Carrimed or Rheometrics).

In each of these devices, the nature of the material constituting the cylinders, discs and plates in motion, directly in contact with the emulsion to be treated, is not essential according to the invention.

However, this material is chosen so as not to bring about coalescence of the droplets of the emulsion at the surface of the said cylinders, discs and plates. Such a coalescence would cause the appearance of a sliding layer which would be liable to reduce the shear forces required for formation of the secondary emulsion and possibly cause them to disappear. As examples of suitable materials, mention may be made of glass, PLEXIGLASS, titanium, stainless steel and aluminium.

In the devices used to generate the shear stress, the surfaces in motion can either be smooth, rough, undulating or have relatively deep cavities.

The temperature is a parameter which can have a considerable influence on the viscosity of the continuous and dispersed phases. It can also reduce the stability of the droplets of the emulsion.

The shear stress generated by the devices described above do not generally lead to large temperature fluctuations. However, for the sake of caution, it may be useful to thermostatically regulate the mechanical shear devices used.

The maximum value of the shear rate to which the primary emulsion is subjected depends on the spin speed, the rate of oscillation and/or the oscillation amplitude of the motion of the plates, cylinders and discs in the devices described above.

In general, it has been observed that a high value of the maximum shear rate leads to the formation of emulsions consisting of very small droplets with a very narrow particle size distribution.

In order to increase the value of the maximum shear rate, a person skilled in the art can vary several parameters, namely the spin speed, the rate of oscillation and/or the oscillation amplitude of the motion of the plates, cylinders and discs in the devices described above, as well as varying the size of the respective chambers of these various devices in the direction perpendicular to the direction of flow imposed by the motion of the surface.

However, when the effective viscoelasticity of the emulsion is very high, for example in the case of a primary emulsion whose dispersed phase is very concentrated and whose continuous phase is itself viscoelastic, it is preferable to reduce the size of the chamber. This is because an increase in the oscillation amplitude and/or in the rate of motion could lead to non-uniform flow (by formation of fractures), which should be avoided.

It will be noted that the maximum shear rate varies linearly with the oscillation amplitude and/or the rate of motion, and inversely proportional to the size of the chamber in a direction perpendicular to the direction of flow.

In general, the maximum shear rate is between 1 and $1 \times 10^6$ s$^{-1}$.

However, the maximum shear rate is preferably in the range 100–5000 s$^{-1}$ and better still 500–5000 s$^{-1}$.

The process of the invention allows the preparation of monodispersed emulsions.

It should be understood that, according to the invention, the term monodispersed emulsion refers to an emulsion consisting of droplets dispersed in a continuous phase, these droplets being characterized by a very narrow particle size distribution. In the case of a Gaussian type distribution in which the variations in volume occupied by the dispersed material are represented as a function of the diameter of the droplets, it will be considered that the distribution is very narrow when the standard deviation is less than or equal to 30% and preferably from about 5 to 25%.

In order to obtain a monodispersed secondary emulsion, a certain number of conditions must simultaneously be satisfied:

(i) The continuous phase of the emulsion must be viscoelastic.

(ii) The effective viscosity of the starting primary emulsion must be higher than the viscosity of the dispersed phase A, the said viscosities being measured at low shear rates, preferably between 10 and 100 s$^{-1}$. Preferably, the viscosity of the continuous phase B is also higher than the viscosity of the dispersed phase A, the said viscosities being measured at low shear rates, preferably between 10 and 100 s$^{-1}$.

(iii) For as long as the emulsion is flowing when subjected to the controlled shear, this flow must be uniform, as opposed to a non-uniform flow with fracture effects.

More specifically, when the controlled shear is achieved by placing the said emulsion in contact with a solid surface in motion, uniform flow is characterized by a constant velocity gradient in a direction perpendicular to that of the solid surface in motion.

One means of controlling the flow consists in varying the size of the chambers in the direction perpendicular to that of the flow imposed by the motion of the surface.

Figure 1:
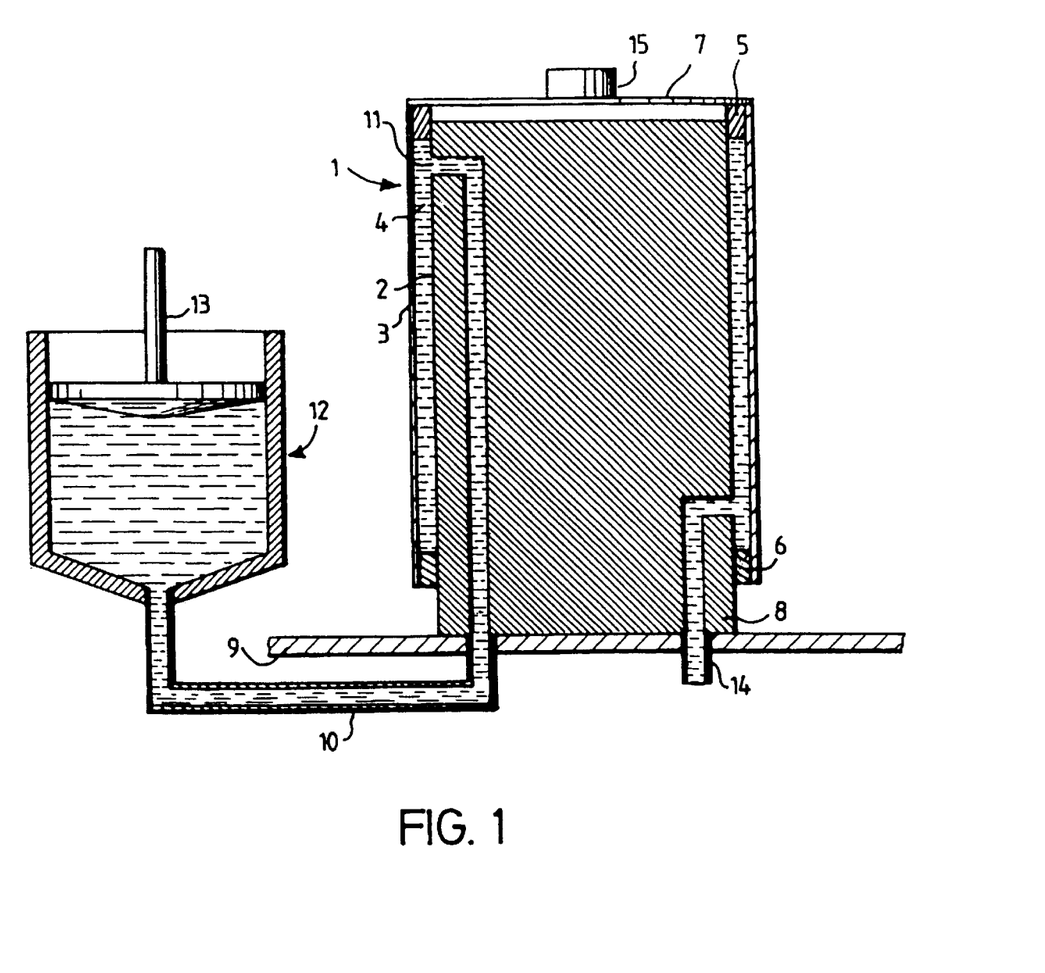
FIG. 1 is a cutaway view of a so-called Couette cell 1; this consists of two concentric cylinders 2 and 3 in constant rotation relative to each other.
Figure 2:
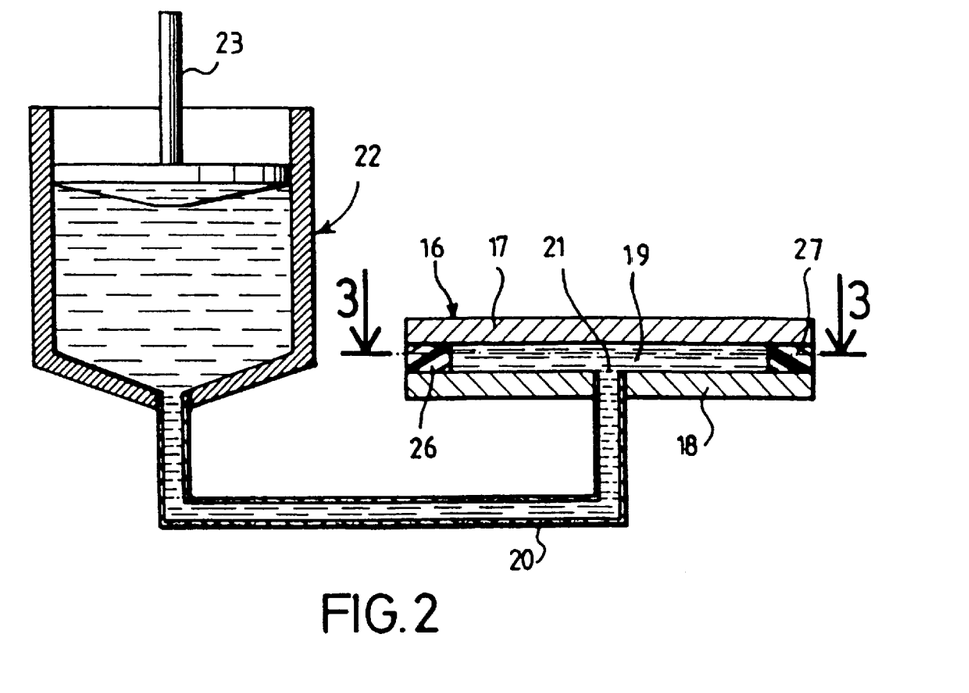
FIG. 2 is a cutaway view of a second device 16 for the application of shear forces.
Figure 3:
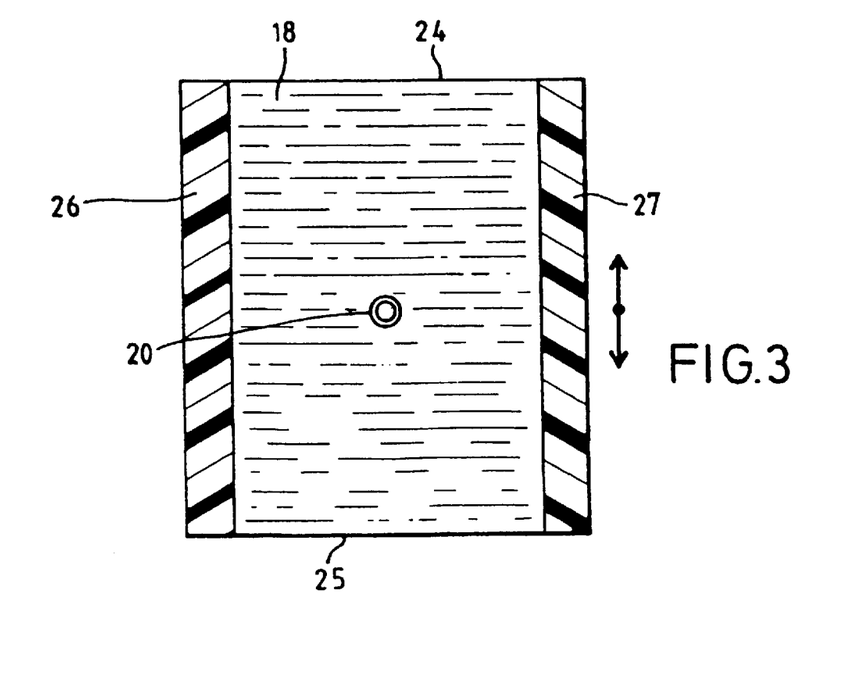
FIG. 3 is a view along the axis 3—3 of FIG. 2 of this same device. The device 16 consists of two identically-sized parallel plates 17 and 18 oscillating relative to each other.
Figure 4:
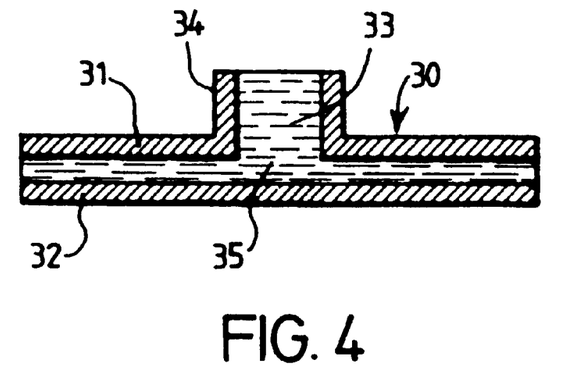
Figure 5:
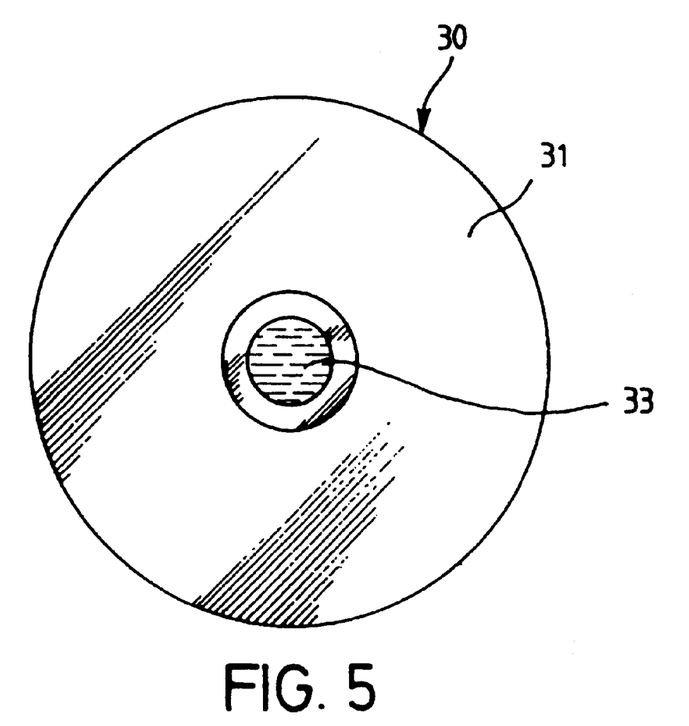
FIG. 5 is a top view of this same device 30.

It will be noted that, in the case of the device in FIG. 1, this size is defined by the difference ($R_3-R_2$). In the case of FIG. 2, this size is defined by the distance separating the two parallel plates in a direction perpendicular to them. In the case of FIG. 4, this size is defined by the distance separating the two discs in the direction of the axis of rotation of the lower disc.

In general, non-uniform flow can be made uniform by reducing the size of the chamber and more particularly by reducing its size in the direction perpendicular to that of the flow.

Thus, it has been possible to observe that for emulsions of oil-in-water type and in the case of the devices represented schematically in FIGS. 1 to 5, this size is preferably maintained below 200 $\mu$m.

The process of the invention makes it possible to prepare secondary emulsions whose droplet size is between 0.05 and 50 $\mu$m, preferably between 0.1 and 10 $\mu$m.

The value of the diameter of the droplets of the emulsion obtained can be measured by carrying out any of the methods known in the prior art: two of these methods are commonly used in the art. The first is phase contrast microscopy, the second is laser granulometry. A third method which is suitable for the case of emulsions consisting of at least 65% by weight of dispersed phase consists in filling with secondary emulsion a cell which allows at least 80% of the incident light to be transmitted. By passing a laser beam through the cell and placing a screen in the pathway after the cell, a diffusion ring is observed, the position of which gives the mean diameter $2a$ of the droplets directly by using the standard formula:

$$2a = 2\lambda \cdot (n \cdot \sin\theta/2)^{-1}$$

θ being the angle formed by the position of the ring and the initial beam,

λ being the wavelength of the light, and n being the refractive index of the medium.

It is seen from the present description that the process of the invention can be used either in order to prepare monodispersed emulsions of narrow particle size distribution or in order to prepare emulsions containing a very low percentage of surfactant, and, for example, down to less than 5% by weight of surfactant relative to the total weight of the emulsion.

The process of the invention finds applications in many fields.

In the pharmaceutical and cosmetological fields, the monodispersed secondary emulsions resulting from the process of the invention are particularly useful. From the point of view of the pharmaceutical formulation, it is known, in fact, that the passage of certain active ingredients across the skin is accelerated when they are vectorized in the droplets of an emulsion which has as narrow as possible a particle size distribution. Moreover, by the process of the invention, monodispersed polymeric vectors can readily be prepared. Indeed, it suffices, starting with a monodispersed secondary emulsion of polymerizable monomers, resulting from the process of the invention, to initiate the polymerization reaction in situ.

In the cosmetic field, the invention allows the preparation of monodispersed emulsions solely comprising droplets larger than 10 μm in diameter, which are virtually free of smaller droplets. Such emulsions are, for example, iridescent, translucent monodispersed creams or covering emulsions to be incorporated into shampoos.

In the field of detergents, the process of the invention allows the mass production of antifoaming emulsions that are particularly effective on account of the absence of droplets smaller than 20 μm in size. In this field, the process of the invention constitutes a considerable technical advance since the processes currently used lead to only about 50% of droplets which are of efficient size in terms of the antifoaming activity.

Latex dispersions can advantageously be prepared, continuously, by the process of the invention. This is all the more advantageous since the processes known in the prior art allow only batchwise production of latex dispersions. The preparation of such dispersions involves, according to the invention, steps of emulsification of polymerizable monomers in a continuous phase, and of polymerization.

The lubricant properties of various types of emulsion can also be improved by the process of the invention since it allows the formation of emulsions consisting of very small droplets.

The invention is thus also applicable to the treatment of surfaces.

In the field of liquid crystal displays, the invention allows the preparation of calibrated emulsions of liquid crystal. By mixing together such monodispersed emulsions of different particle size, it is possible to optimize the optical display properties associated with the size of the droplets present in the emulsion.

Mention may also be made of the application of the process of the invention to the fields of plant protection and water-based paints.

The examples which follow, which refer to the attached FIGS. 6 to 14, illustrate the invention.

More specifically, FIGS. 6 to 9 relate to the results of a study of the polydispersity of a polydimethylsiloxane-in-water emulsion as a function of the variations in shear rate, the proportion of surfactant present in the aqueous phase and the proportion of polydimethylsiloxane in the emulsion.

Figure 10:
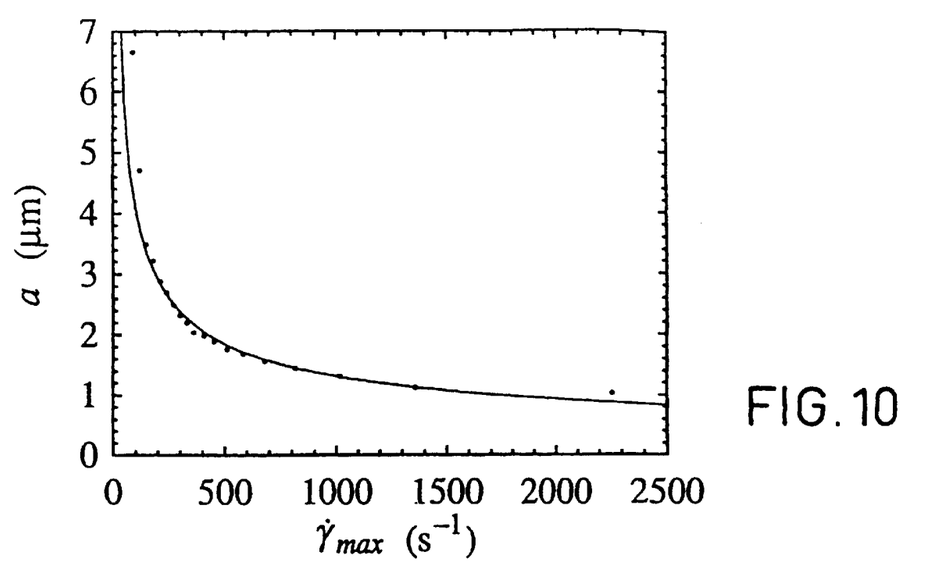
Figure 11:
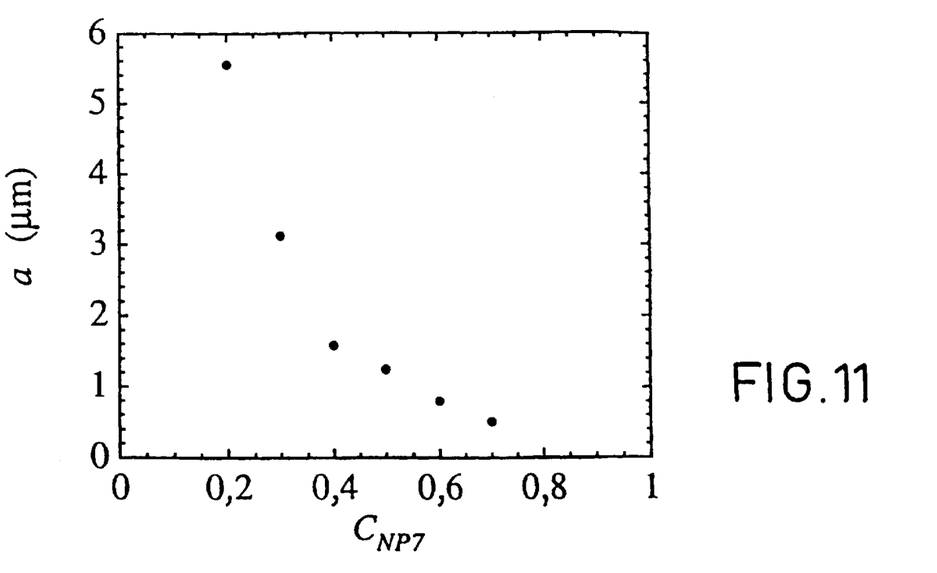
Figure 12:
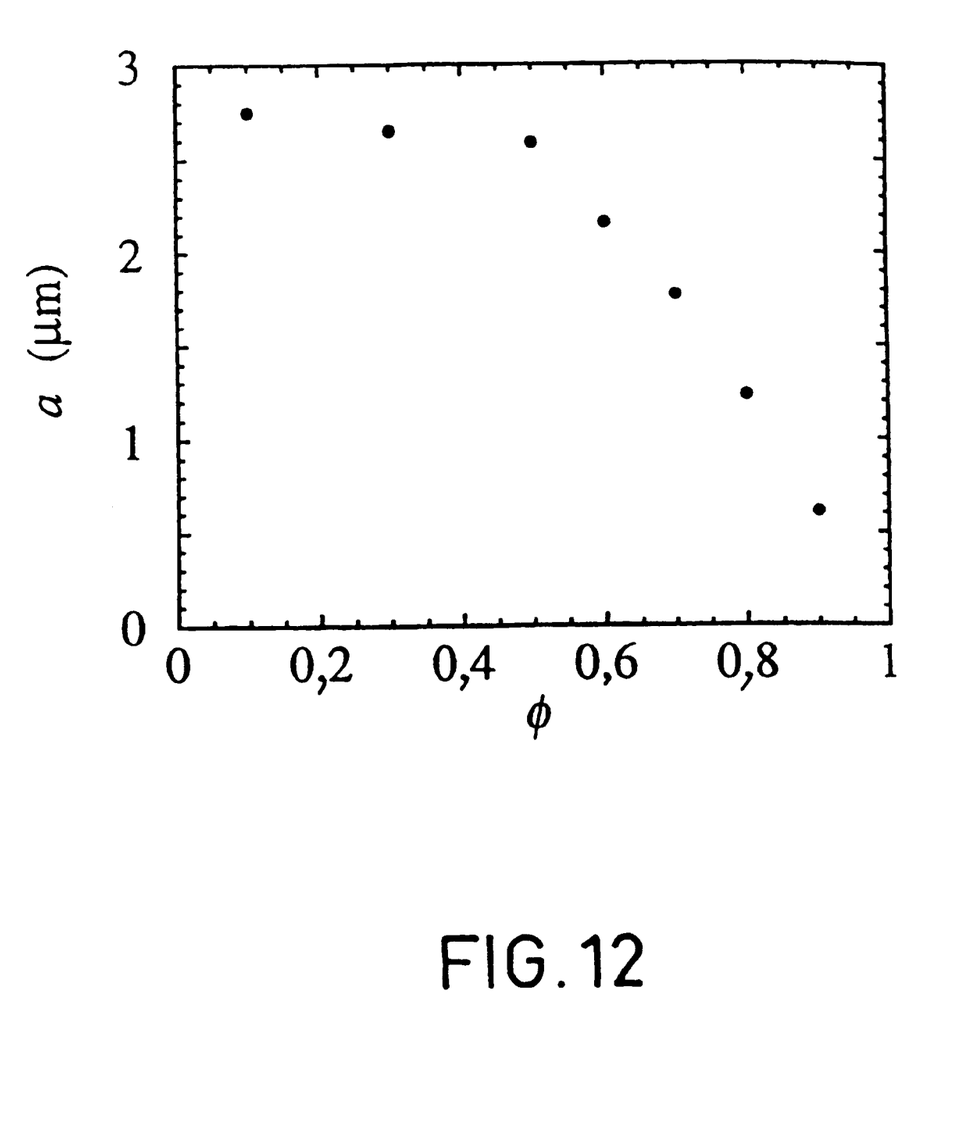
Figure 13:
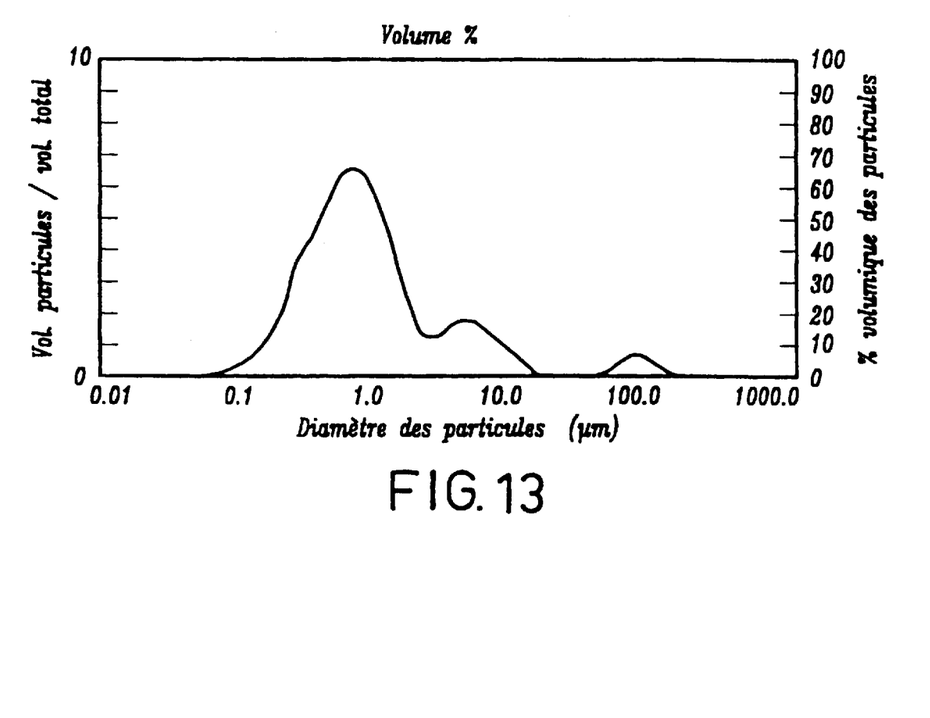
Figure 14:
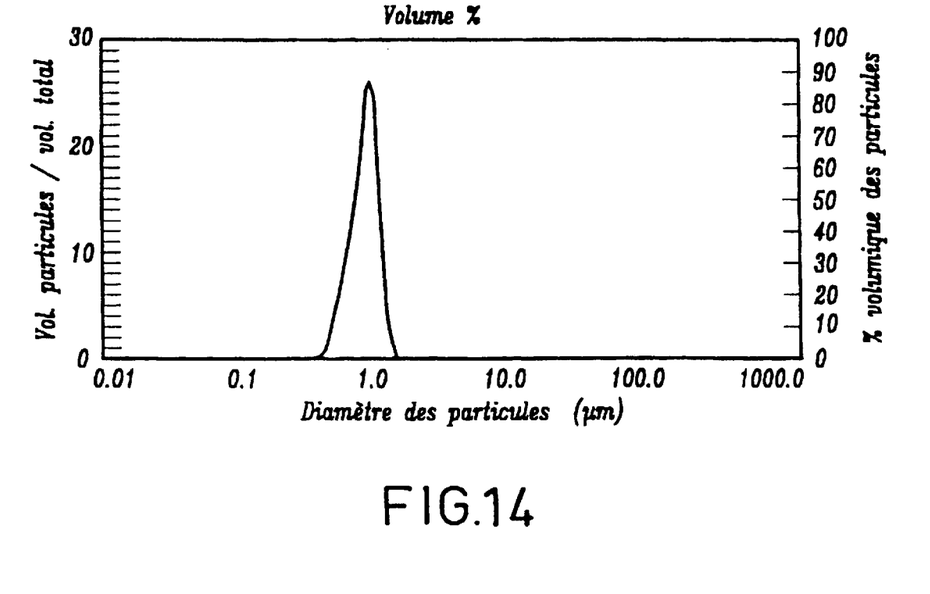

FIGS. 10 to 12 show the results of a second study relating to the influence of these same parameters (shear rate, proportion of surfactant and proportion of silicone) on the particle diameter of a monodispersed polymethylsiloxane-in-water emulsion. FIGS. 13 and 14 illustrate the results obtained with a liquid petrolatum-in-water emulsion.

For all the examples, the device generating the shear stresses is that represented in FIG. 2. The oscillatory motion of the moving plate is such that the ratio of the maximum amplitude of deformation of the plate to the size of the chamber in a direction perpendicular to the plates is greater than 1. The droplet size was determined in all cases by phase contrast microscopy and by laser granulometry.

The surfactants used are sold by the company ICI.

The polydimethylsiloxane used in the examples is available from the company Rhone-Poulenc under the reference Rhodorsil.

In Examples 1 to 4, the Gaussian curves describing the particle size distribution of the secondary emulsion obtained represent the variations in the volume occupied by the dispersed material as a function of the diameter of the droplets.

EXAMPLE 1

In this example, the operating conditions were established such that the shear rate denoted by y hereinbelow is equal to 50 $s^{-1}$.

The primary emulsion is a polydimethylsiloxane-in-water emulsion optionally containing a certain amount of TERGITOL-NP7 as surfactant.

The monodispersity of this emulsion was studied for various concentrations of silicone and surfactant. The results obtained have been collected in FIG. 6. The parameters $C_{NP7}$ and φ, carried on the y-axis and x-axis respectively of the diagram in FIG. 6, correspond respectively to the proportion by mass of surfactant in the aqueous phase and to the percentage by volume of silicone in the total emulsion.

Figure 6:
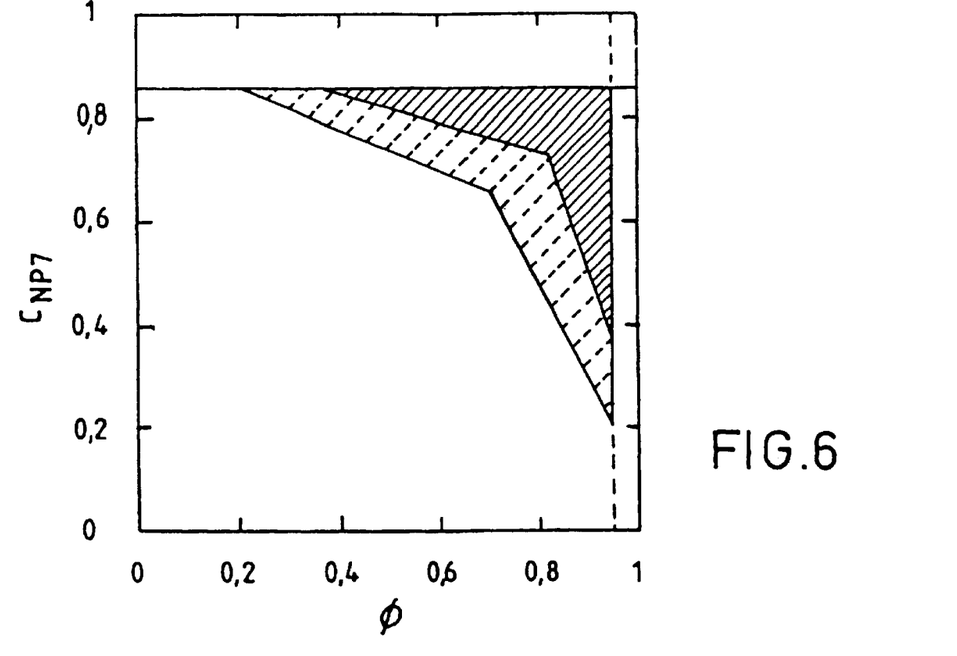

In this figure, the area shaded with solid lines corresponds to a polydispersity range such that the standard deviation of the Gaussian curve representing the particle size distribution by volume of the emulsion is less than 10%. In the region shaded with dotted lines, the standard deviation has a value of between 10 and 20%.

EXAMPLE 2

The operating procedure in this case is identical to that in the above example except that the operating conditions have been modified such that the shear rate is equal to 500 $s^{-1}$.

Figure 7:
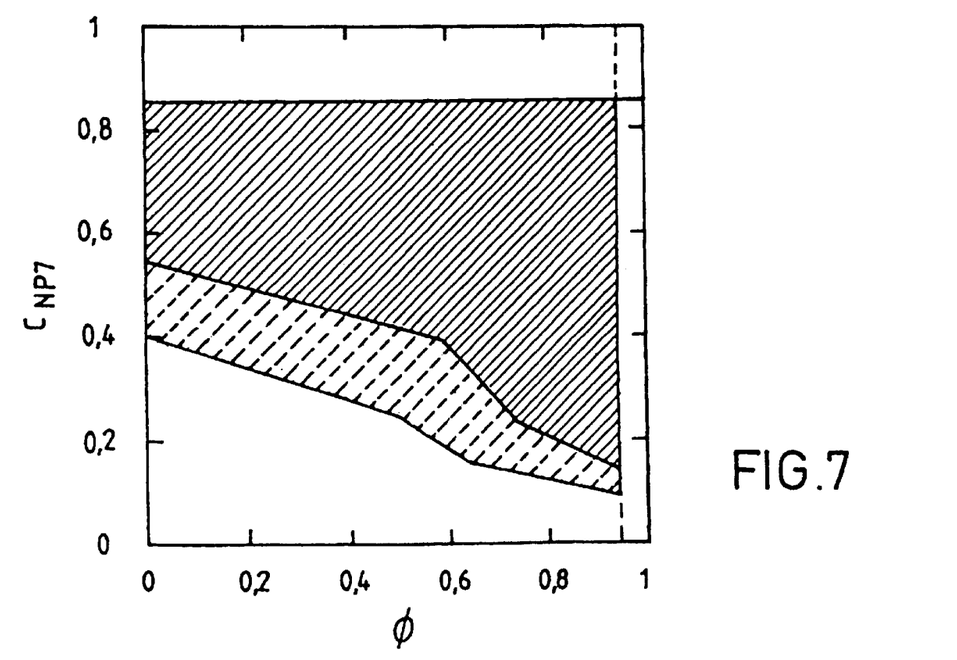

The results obtained have been represented in FIG. 7. It will be noted that the area shaded with solid lines corresponds to a polydispersity range such that the standard deviation of the Gaussian curve representing the particle size distribution by volume of the emulsion is less than 10%. In the region shaded with dotted lines, the standard deviation has a value of between 10 and 20%.

EXAMPLE 3

The operating procedure in this case is identical to that in the above example except that the operating conditions have been modified such that the shear rate is equal to $5000$ s.$^{-1}$.

Figure 8:
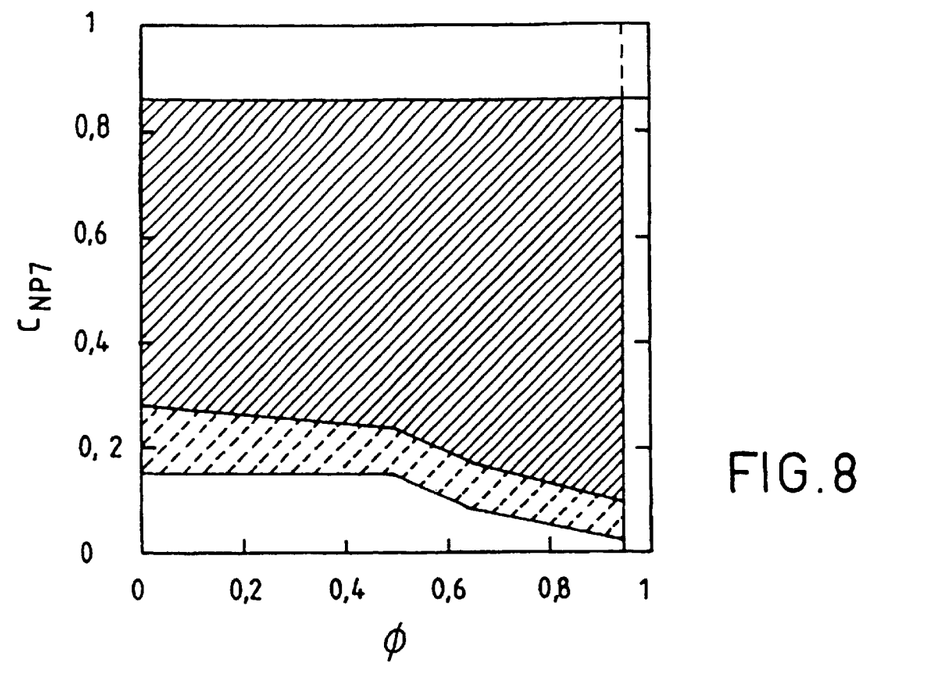

The results obtained have been represented in FIG. 8. As in the above example, the area shaded with solid lines corresponds to a polydispersity range such that the standard deviation of the Gaussian curve representing the particle size distribution by volume of the emulsion is less than 10%. In the region shaded with dotted lines, the standard deviation has a value of between 10 and 20%.

EXAMPLE 4

In this example, the primary emulsion is a polydimethylsiloxane-in-water emulsion in which the aqueous phase contains 40% by weight of TERGITOL-NP7 as surfactant.

The monodispersity of the emulsion obtained by applying the process of the invention was studied as a function of the value of the shear rate $\gamma$ and of the concentration of polydimethylsiloxane.

Figure 9:
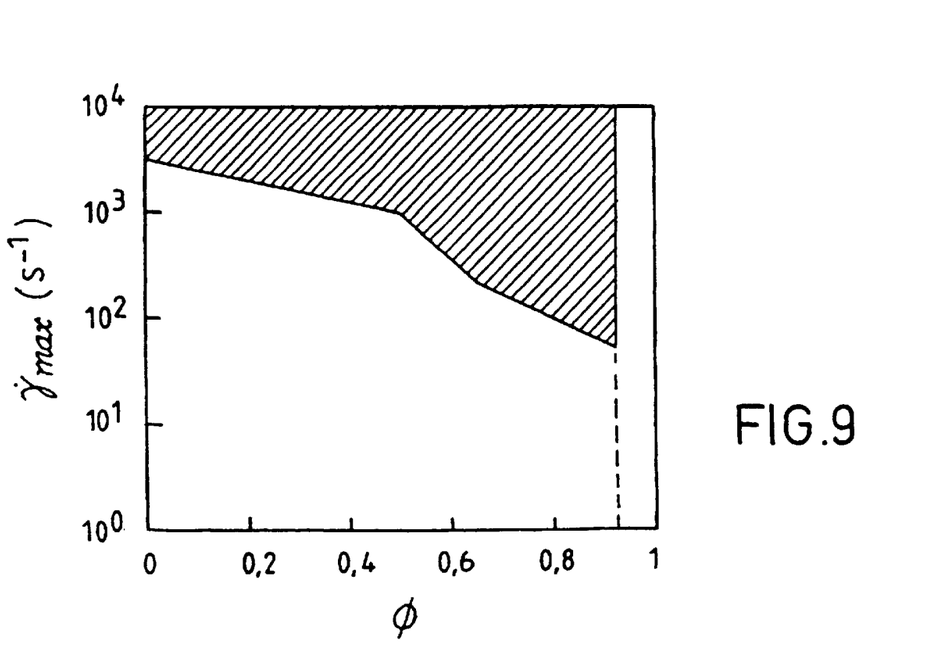

FIG. 9 summarizes the results obtained. In this figure, $\gamma$ represents the shear rate and $\phi$ is as defined in Example 1.

The shaded area represents a range in which the polydispersity is such that standard deviation of the Gaussian curve representing the particle size distribution by volume is less than 10%.

Examples 1 to 4 show that the monodispersity zone is wider for increasing values of the shear rate.

In addition, the study carried out shows that the monodispersity is obtained for values of $\gamma$ and of $C_{NP7}$ which ensure the viscoelasticity of the continuous phase, that is to say for a sufficient concentration of the dispersed phase and for a sufficient concentration of the surfactant.

EXAMPLE 5

The primary emulsion treated is that of Example 4 above, the proportion by volume of polydimethylsiloxane in the emulsion being set at 60%.

In this example, the variations in the radius a of the droplets of the final secondary emulsion were studied as a function of the shear rate applied, in the monodispersity field.

The results obtained are given altogether in FIG. 10.

This example shows that the droplet size decreases for increasing values of the shear rate. Thus, this experiment reveals that the shear rate allows the size of the droplets in the emulsion to be controlled simply.

EXAMPLE 6

The primary emulsion treated is a polydimethylsiloxane-in-water emulsion whose proportion by volume of polydimethylsiloxane in the emulsion was set at 60%. The value of the shear rate was kept constant and equal to $1000$ s$^{-1}$.

In this example, the variations in the radius a of the droplets of the final secondary emulsion were studied as a function of the proportion by mass of TERGITOL-NP7 in the aqueous phase, in the monodispersity field.

The results obtained are given altogether in FIG. 11, $C_{NP7}$ being as defined in Example 1.

This example shows that the droplet size decreases for increasing values of the surfactant concentration. Indeed, by increasing the amount of surfactant, the viscoelasticity of the medium is increased by varying the values of G' and G", the effect of which is to decrease the droplet size.

EXAMPLE 7

The primary emulsion treated is a polydimethylsiloxane-in-water emulsion in which the proportion by mass of TERGITOL-NP7 the aqueous phase has been set at 40%.

In this example, the variations in the radius a of the droplets of the final secondary emulsion were studied as a function of the proportion by volume of polydimethylsiloxane in the emulsion, in the monodispersed field.

The results obtained are given altogether in FIG. 12, $\phi$ being as defined in Example 1.

This example shows that the droplet size decreases for increasing values of the concentration of the dispersed phase. Here also, it is confirmed that by increasing the viscoelasticity of the medium by increasing the concentration of the dispersed phase, a reduction is observed in the droplet size.

EXAMPLE 8

The primary emulsion is a polydimethylsiloxane-in-water emulsion consisting of 70% by volume of polydimethylsiloxane, to which has been added 20% by weight of dextran relative to the total weight of the aqueous phase and 1% by weight of sodium dodecyl sulphate relative to the total weight of the aqueous phase. The dextran used is that sold by the company Sigma, of molecular mass 100,000.

It is noted that a minimum amount of surfactant is needed in order to prevent the droplets from coalescing and to ensure the stability of the emulsion. In this case, it is the addition of 20% by weight of dextran which allows the viscoelasticity of the emulsion to be controlled.

EXAMPLE 9

The primary emulsion is a mineral oil (Sigma)-in-water emulsion consisting of 60% by weight of liquid petrolatum, to which 35% by weight of TERGITOL-NP7 has been added.

The treatment is carried out in a Couette cell [gap:200 $\mu$m]. The granulograms obtained using a Malvern Mastersizer granulometer are represented in FIGS. 13 (premix before shear) and 14 (after shear).

The particle diameters ($\mu$m) and the volume of the particles (%) are represented on the x-axes and the proportion of particles (vol/total vol) and the % by volume of the droplets are represented on the y-axes.

The shear rate $\gamma$ was $1217$ s$^{-1}$.

The mean droplet diameter ($\delta$) is set at 1 $\mu$m. The degree of polydispersity is 23%.

We claim:
1. Process for preparing a secondary emulsion consisting of droplets of a phase A, dispersed in a phase B, A being immiscible in B, starting with a polydispersed primary emulsion of identical formulation and consisting of droplets of the phase A dispersed in the phase B, the droplets of the secondary emulsion having a diameter in all cases which is less than the diameter of the droplets of the primary emulsion, wherein the starting primary emulsion is viscoelastic and in that the starting primary emulsion is subjected to a controlled shear such that the same maximum shear is applied to the entire emulsion.

2. Process according to claim 1, wherein the continuous phase of the starting primary emulsion is viscoelastic.

3. Process according to claim 2, wherein the starting primary emulsion contains not more than 5% by weight of surfactant.

4. Process according to claim 1, wherein the effective viscosity of the starting primary emulsion is higher than the viscosity of the dispersed phase A, the viscosities being measured at low shear rates.

5. Process according to claim 4, wherein the viscosity of the continuous phase B is higher than the viscosity of the dispersed phase A, the viscosities being measured at low shear rates.

6. Process according to claim 1, wherein the controlled shear is achieved by placing the emulsion in contact with a solid surface in motion, the velocity gradient characterizing the flow of the emulsion being constant in a direction perpendicular to that of the solid surface in motion.

7. Process according to claim 1 for the preparation of a monodispersed secondary emulsion, wherein (1) the continuous phase of the starting primary emulsion is viscoelastic;

(2) the effective viscosity of the starting primary emulsion is higher than the viscosity of the dispersed phase A, the viscosities being measured at low shear rates; and (3) the controlled shear is achieved by placing the emulsion in contact with a solid surface in motion, the velocity gradient characterizing the flow of the emulsion being constant in a direction perpendicular to that of the solid surface in motion.

8. Process according to claim 1, wherein the viscosity of the continuous phase B is higher than the viscosity of the dispersed phase A, the viscosities being measured at low shear rates.

9. Process according to claim 1, wherein the starting primary emulsion contains at least 65% by weight of phase A dispersed in phase B.

10. Process according to claim 9, wherein the starting primary emulsion contains at least 80% by weight of phase A dispersed in phase B.

11. Process according to claim 1, wherein the starting primary emulsion is an emulsion of oil-in-water type.

12. Process according to claim 11, wherein the oil is a silicone.

13. Process according to claim 12, wherein the silicone is a polydimethylsiloxane.

14. Process according to claim 12, wherein the silicone is a polydiorganosiloxane in which the radicals attached to the silicon are chosen from the group consisting of $C_1$–$C_{16}$ alkyl, phenyl, vinyl and hydrogen atoms.

15. Process according to claim 1, wherein the starting primary emulsion comprises one or more surfactants.

16. Process according to claim 15, wherein the surfactant(s) represent(s) from 20 to 40% of the weight of the aqueous phase.

17. Process according to claim 1, wherein the droplets of the starting primary emulsion have a diameter ranging between 1 and 100 μm.

18. Process according to claim 1, wherein the maximum value of the shear rate is from 1 to $1 \times 10^6 s^{-1}$.

19. Process according to claim 18 wherein the maximum value of the shear rate is from 100 to 5000 $s^{-1}$.

20. Process according to claim 1, wherein the shear is achieved using a cell consisting of two concentric cylinders rotating relative to each other.

21. Process according to claim 1, wherein the shear is achieved using a cell consisting of two parallel plates in oscillating motion relative to each other.

22. Process according to claim 1, wherein the shear is achieved using a cell consisting of two concentric discs in rotation relative to each other.

23. Process according to claim 1 which is carried out in a device comprising:

two identically-sized parallel plates (17, 18) oscillating relative to each other in a direction parallel to the two plates;

two parallelepipedal-shaped leaktight joints (26, 27) located as spacers between the two plates (17, 18), the two plates (17, 18) and the spacers delimiting a chamber (19) in which the primary emulsion circulates; and an emulsion supply pipe (20) passing through the lower plate (18) and emerging in the central part of said chamber (19), said supply pipe being connected at its other end to a reservoir for the primary emulsion.

24. Process according to claim 1 which is carried out in a device comprising:

two concentric discs (31, 32) delimiting a chamber (33) in which the primary emulsion circulates, the lower disc (32) rotating uniformly about its axis, whereas the upper disc (31) is immobile; and an emulsion supply pipe (34) passing through the upper disc (31) and emerging in the central part of said chamber (33), said supply pipe being connected at its other end to a reservoir for the primary emulsion.

* * * * *